Figure 1:
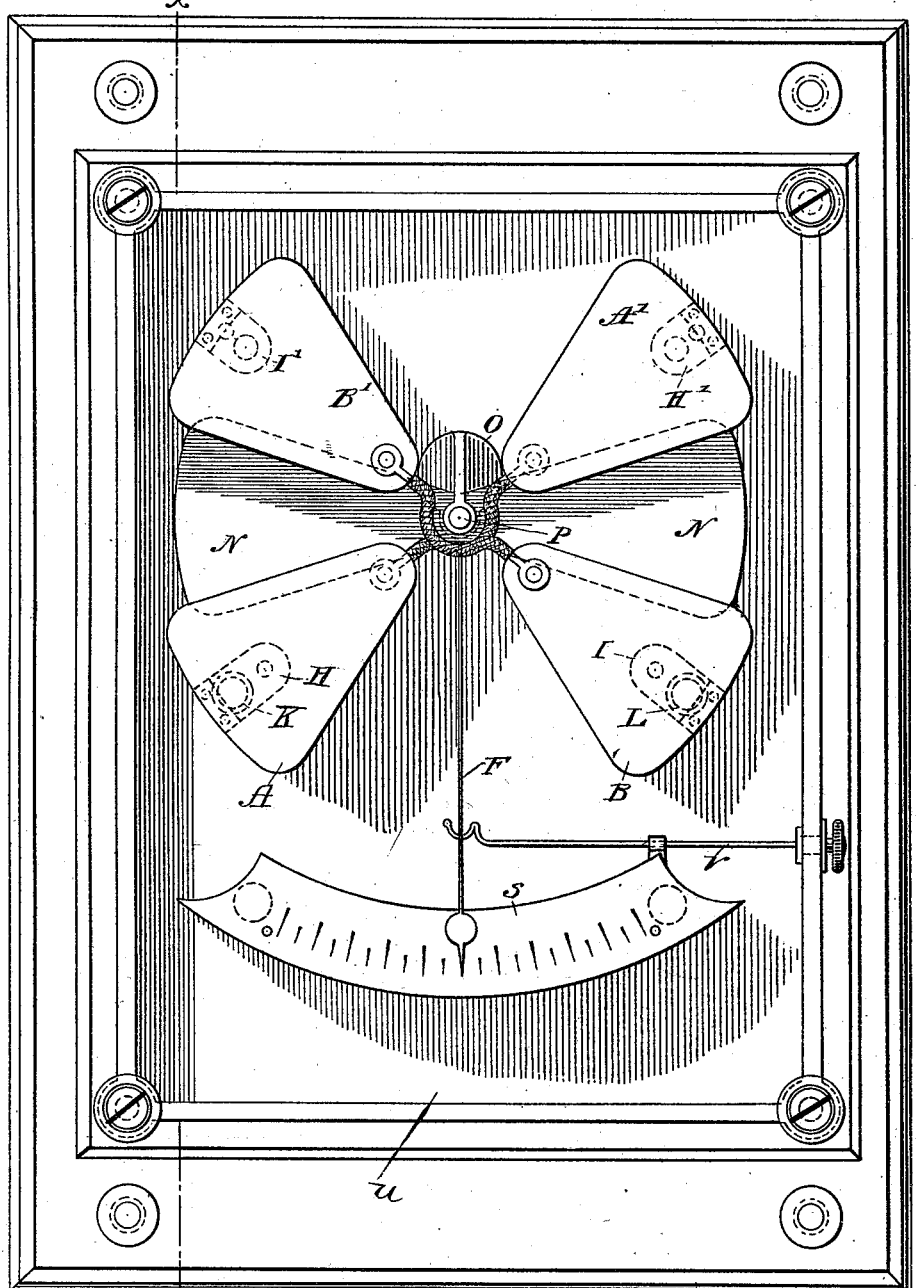

(No Model.) 2 Sheets—Sheet 1.
J. F. KELLY.
METHOD OF AND MEANS FOR DETECTING GROUNDS.

No. 554,275. Patented Feb. 11, 1896.

WITNESSES:
Frank E. Ober
C. B. Eaton

INVENTOR
John F. Kelly
BY
H. B. Brownell
his ATTORNEY (No Model.) 2 Sheets—Sheet 2.
J. F. KELLY.
METHOD OF AND MEANS FOR DETECTING GROUNDS.
No. 554,275. Patented Feb. 11, 1896.
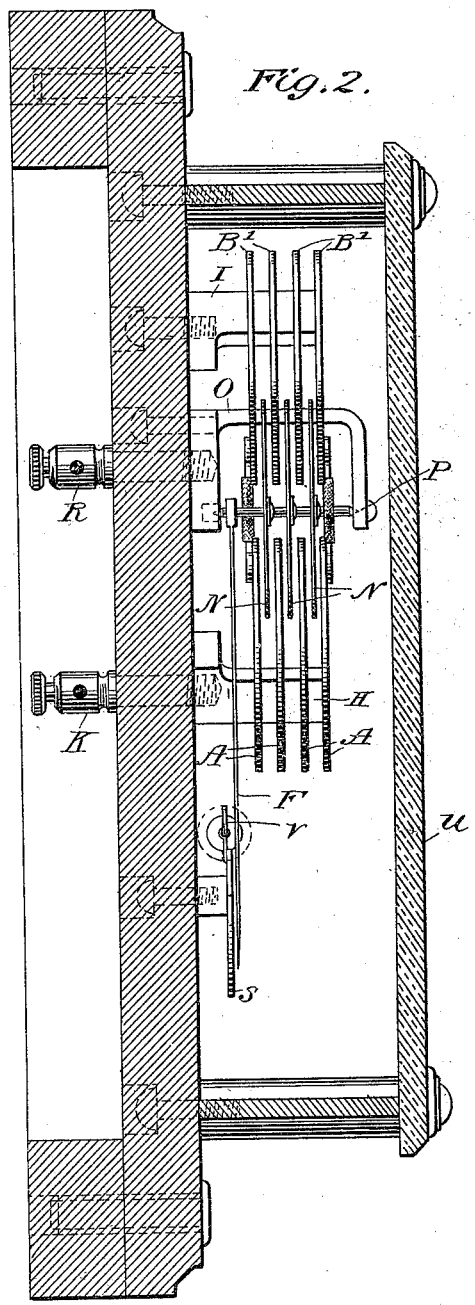
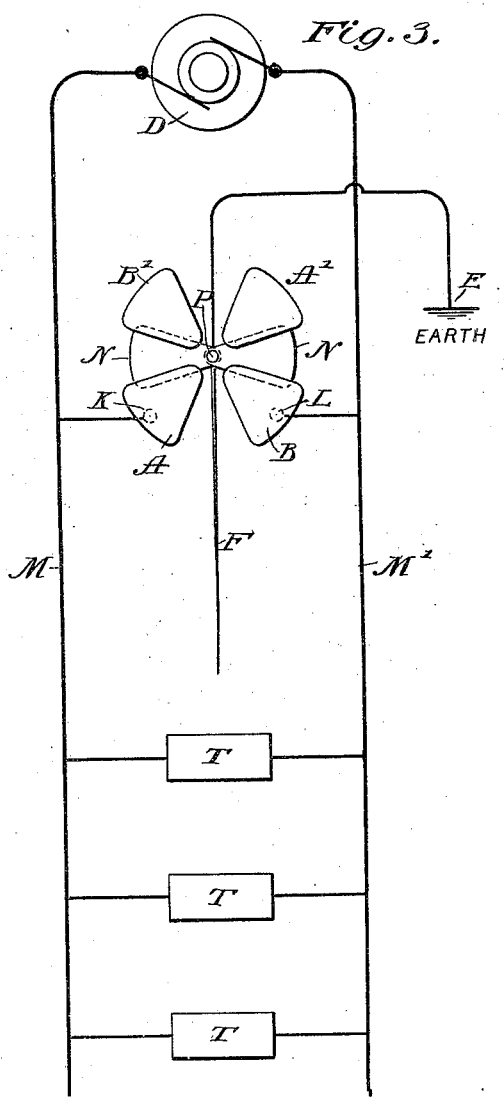

UNITED STATES PATENT OFFICE.

JOHN F. KELLY, OF PITTSFIELD, MASSACHUSETTS, ASSIGNOR OF ONE-HALF TO CUMMINGS C. CHESNEY, OF SAME PLACE.

METHOD OF AND MEANS FOR DETECTING GROUNDS.

SPECIFICATION forming part of Letters Patent No. 554,275, dated February 11, 1896.

Application filed June 17, 1895. Serial No. 553,017. (No model.)

*To all whom it may concern:*

Be it known that I, JOHN F. KELLY, a citizen of the United States, residing at Pittsfield, county of Berkshire, and State of Massachusetts, have invented a new and useful Method of and Means for Detecting Grounds and other Abnormal Conditions in Electric Circuits, of which the following is a specification.

My invention relates to the detecting of grounds in electric circuits and indicating the conditions of such circuits, and has for its object to provide a means and a method whereby the presence of a ground or similar abnormal condition may be indicated without interfering with the otherwise normal working of the circuit in any way, or consuming any appreciable amount of energy.

The following is a description of my invention, reference being had to the accompanying drawings, in which—

Figure 1 represents a front elevation of the indicator of my device. Fig. 2 is a side elevation, the casing being shown in section on the line $x$ $x$ of Fig. 1. Fig. 3 shows diagrammatically a system embodying my device.

In my invention I take advantage of the fall in potential due to an abnormal condition of the line, and do not use any continuous conductor leading from the mains to the ground, but make use of the changes in the fields of force about the conductors of the system, which changes accompany the changes of potential. To do this I place in the neighborhood of the two branches of the conductor or the conductor expanded a pivoted metallic sheet or needle, such that when it is balanced on its support, the line being in a normal condition, its two ends, which are flat vane-like projections, are equally within the influence of the fields of the two branches of the circuit. This needle is electrically connected to the earth. As long as the two sides of the line are of the same average difference of potential, the needle will be attracted equally by each side, but if either side begins to leak heavily the part of the needle influenced by that side will be subjected to a correspondingly less intense field, and the needle will be drawn toward the side having the higher difference in potential, so that the condition of the line is indicated by subjecting a needle always at zero potential to the influence of two fields corresponding to the potential of the two mains. The result is that, so long as the two differences of potential upon the two mains are symmetrical with reference to that of the needle, there is no movement of the indicating-wand, however much the electromotive force of the system or the two differences of potential on the mains may vary. If, however, one of the two differences of potential varies more than the other, by reason of a ground or other like cause, so that the differences of potential are no longer symmetrical, the lack of symmetry between the two differences will be indicated at once.

By reason of the fact that there is no connection between the mains, or between either of them and the earth, practically no current is consumed by my indicator although it be left connected to the mains, and there is no danger such as exists in indicators where the mains are directly connected with the ground.

In the drawings, M M' represent the two branches of a circuit leading from the generator D.

T T are translating devices of any kind.

The branches M and M' are attached to or expanded into wings A and B, insulated from each other. In addition to the wings A and B there are preferably two auxiliary wings A' and B' electrically connected to the wings A and B. Supported at its center on a pivoted bearing P is a metallic needle N, having vanes which lie quite close to the wings A A' and B B', so as to have the separate vanes subjected to the influence of the respective fields of the two branches of the circuit. This needle N is electrically connected, preferably through its pivot, to the earth, as at E, and is thereby maintained at zero potential. Attached to the needle is a wand F. When a leak occurs in the circuit—for instance, in the branch M'—the potential falls, as above described, not only along the main, but also in the wings or expanded portions B B', whereupon the needle is attracted more strongly by the wings or expanded portions A A' than by B B', and the left end of the needle being thereby depressed the wand indicates which main is the one affected.

In Figs. 1 and 2 of the drawings some details are shown other than those above mentioned. In these figures, which show the wings and needle in the form preferred by me, the wings A A' and B B' are quadrupled, being arranged in tiers, those of each tier being electrically connected by supporting-posts H H' and I I' respectively. The posts H and I terminate in binding-posts K and L, to which conductors leading from the mains M and M' are connected. The needle N is threefold, its parts alternating with the parts of the stationary wings. The needle and its pinion are electrically connected through its bearings with its supporting-post O. This supporting-post terminates in a binding-post R, by which connection is made with the conductor leading to the ground. S is a scale before which the wand F swings. The wand may be held stationary by the rod V, which terminates in a knob beyond the casing. The indicating device is all contained in a glass case U.

I would have it understood that I do not intend to limit myself to the exact form of my invention described above, but reserve to myself the right and liberty of making such changes as may come fairly within its scope, the form above described being at present preferred.

Having thus described my invention, what I claim is—

1. In a ground-detector, two wings or sets of wings, each having the potential of one of the branches of the circuit, in combination with a needle whose potential is maintained at zero, lying within the influence of said wings, substantially as described.

2. In an electrical circuit, a ground-detector consisting of two wings or sets of wings electrically insulated from each other, connected to the opposite sides of the circuit, in combination with a pivoted needle electrically connected to the earth, having two vanes, one within the influence of each of the respective fields of said wings.

3. In a ground-detector, two sets of wings electrically insulated from each other, and consisting of several parts, each set electrically connected to one of the branches of the circuit, in combination with a needle having two vanes, each having several parts, alternating with the parts of said wings and lying within their fields and electrically connected to the earth, substantially as described.

4. The method of detecting grounds or similar abnormal conditions of the line consisting in subjecting a pivoted needle of zero potential to the influence of two fields corresponding in potential respectively to the potential of the two mains, substantially as described.

5. The method of detecting grounds or leaks upon an electric circuit which consists in maintaining a conducting-needle at zero potential, and subjecting separate parts of such needle to the influence of two fields, each maintained at the potential of one of the respective branches of the circuit, substantially as described.

In testimony whereof I have hereunto set my hand this 14th day of June, 1895.

JOHN F. KELLY.

Witnesses:
 HENRY L. FRIDENBERG,
 A. C. CLARK.